United States Patent
Fedigan et al.

(10) Patent No.: US 9,225,264 B1
(45) Date of Patent: Dec. 29, 2015

(54) METHOD AND APPARATUS FOR MULTIPHASE INVERTER CONTROL

(71) Applicant: Texas Instruments Incorporated, Dallas, TX (US)

(72) Inventors: Stephen John Fedigan, Plano, TX (US); Paul LeRoy Brohlin, Parker, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 14/468,867

(22) Filed: Aug. 26, 2014

(51) Int. Cl.
*H02M 7/537* (2006.01)
*H02M 7/5395* (2006.01)

(52) U.S. Cl.
CPC .................... *H02M 7/5395* (2013.01)

(58) Field of Classification Search
CPC .......... H02M 7/5395; H02M 7/53875; H02M 3/156; H02M 2001/385
USPC ................. 323/234, 343, 271, 272, 284, 285; 363/40, 41, 95, 98, 131, 132
See application file for complete search history.

(56) References Cited

U.S. PATENT DOCUMENTS

| | | | |
|---|---|---|---|
| 6,798,157 B2 | 9/2004 | Takahashi et al. | |
| 8,223,521 B2* | 7/2012 | Inoue | H02M 7/53871 363/132 |
| 8,362,759 B2 | 1/2013 | Ha et al. | |
| 8,605,461 B2* | 12/2013 | Hibino | H02P 27/08 363/130 |
| 2003/0117101 A1 | 6/2003 | Fedigan et al. | |
| 2008/0079385 A1 | 4/2008 | Hashimoto et al. | |
| 2009/0189555 A1 | 7/2009 | Chen | |
| 2011/0241723 A1 | 10/2011 | Abel et al. | |
| 2013/0264974 A1* | 10/2013 | Suzuki | H02M 7/53875 318/139 |

* cited by examiner

*Primary Examiner* — Adolf Berhane
*Assistant Examiner* — Afework Demisse
(74) *Attorney, Agent, or Firm* — Michael A. Davis, Jr.; Frank D. Cimino

(57) ABSTRACT

Systems, apparatus and methods are presented for multiphase inverter control in which PWM switching control signals are generated for operating inverter switching devices according to current feedback values, and a given inverter phase is identified in a given PWM switching cycle having the lowest low side duty cycle on-time. A phase current feedback value is selectively computed for the identified phase at least partially according to the low side current shunt voltage values corresponding to other output phases, and the phase current feedback values are updated with the computed phase current feedback value and the low side current shunt voltage values of the remaining output phases to provide feedback for closed loop PWM switching control.

20 Claims, 7 Drawing Sheets

METHOD AND APPARATUS FOR MULTIPHASE INVERTER CONTROL

BACKGROUND

Multiphase inverter circuits provide output electrical power at three or more electrical output phases for powering a multiphase load by alternating operation of high and low side switches connected between DC bus terminals and common for each output phase. Controlling the output of the multiphase inverter typically involves closed loop pulse width modulation (PWM) based on output current feedback information derived from current sensors in the form of shunt resistors connected between a low side switching device and a lower DC bus node. The current through the low side switch is sampled in the on-time during which the low side switch is activated, with the sampling being synchronized with the low side switching control signal. Many inverters utilize insulated gate bipolar transistors (IGBTs) operated at PWM switching frequencies ranging from several kHz to 20 kHz or more. Gallium nitride (GaN) and other faster switching devices allow even higher PWM switching frequencies at 100 kHz and above. However, increased switching frequency creates problems for sampling phase currents using low side current shunt sensors. The voltage across the current shunt is typically sensed using differential amplifiers whose output must settle to within a least significant bit (LSB) of an analog to digital (A/D) converter before sampling can begin to obtain an accurate feedback value representing the low side current. Increasing the switching frequency reduces the on-time pulse width for a given low side duty cycle percentage, and thus allowing sufficient time for amplifier outputs to settle before sampling becomes difficult. Moreover, back EMF from certain loads increases with inverter output speed, and the inverter control loop must compensate by increasing the individual phase output voltages through decreased low side duty cycles. Increases in the bus voltage level at the input of the inverter and/or limiting the maximum inverter output frequency may address the back EMF and reduced on-time issues, but these approaches are undesirable from a system performance perspective. Also, high performance sensing amplifier circuitry can be used, but this adds cost. Accordingly, a need remains for improved methods and apparatus for operating multiphase inverters to facilitate accurate feedback sensing using low side current shunts to facilitate higher PWM switching frequencies without increasing system cost or complexity.

SUMMARY

Various aspects of the present disclosure are now summarized to facilitate a basic understanding of the disclosure, wherein this summary is not an extensive overview of the disclosure, and is intended neither to identify certain elements of the disclosure, nor to delineate the scope thereof. Rather, the primary purpose of this summary is to present various concepts in a simplified form prior to the more detailed description that is presented hereinafter.

Disclosed embodiments provide control apparatus and systems for controlling a multiphase inverter, in which a controller generates PWM signals for selectively operating high and low side inverter switching devices at least in part according to phase current feedback values corresponding to inverter output phases. A computation circuit selectively computes one of the phase current feedback values for a given phase having the lowest or smallest low side duty cycle on-time in a given switching cycle at least partially according to the low side shunt current voltage values corresponding to the remaining output phases, and selectively updates the phase current feedback values with the computed value for the given phase and with the current shunt voltage values for the remaining phases. In this manner, closed loop feedback control can use the computed feedback value for the phase having the smallest duty cycle in a given PWM switching cycle independent of any settling time accuracy issues associated with high PWM switching frequency operation and/or higher output frequency conditions where the low side duty cycle of one phase is small relative to the sampling capabilities of the sensing and conversion circuitry. Accordingly, the control apparatus can be advantageously employed to facilitate high frequency, high-speed multiphase inverter operation without sacrificing feedback sensing accuracy and without increasing system cost or complexity.

In certain embodiments, the computation circuit identifies the given phase having the smallest low side duty cycle according to a computed voltage vector angle used for PWM control of the inverter, and selects from a plurality of predetermined formulas for computing the given phase current feedback value based on the voltage vector angle.

In other embodiments, the given phase and predetermined formula are selected according to the phase having the shortest applied duty cycle in the proceeding PWM switching cycle, thus facilitating operation independent of a computed angle.

In certain embodiments, moreover, the low side duty cycle on-time of the given phase is compared with a predetermined duty cycle threshold, and the phase current feedback value for the given phase is selectively computed and used for updating the feedback values if the low side duty cycle of the given phase is less than the threshold, with the computation circuit otherwise updating the phase current feedback values with the low side current shunt voltage sample values corresponding to all the inverter output phases. In this manner, the computation process can be selectively employed when needed for small low side on-times, and the control apparatus can refrain from performing the computation where the lowest low side on-time is long enough to facilitate proper measurement for use in closed loop control feedback sensing.

Methods are provided for controlling a multiphase inverter in accordance with further aspects of the disclosure, including generating PWM switching control signals at least partially according to a plurality of phase current feedback values to selectively operate inverter switching devices, identifying a given phase having a lowest low side duty cycle on-time in a given PWM switching cycle, selectively computing a given phase current value corresponding to the given phase at least partially according to the low side current shunt voltage values corresponding to the remaining output phases, and selectively updating the phase current feedback values with the given phase current feedback value and the low side current shunt voltage values corresponding to the remaining output phases.

Certain embodiments of the method further involve computing a voltage vector angle, generating the PWM switching control signals at least partially according to the voltage vector angle and the phase current feedback values, and identifying the given phase according to the voltage vector angle. In other embodiments, the method includes identifying the given phase according to an indication indicating a phase having a shortest applied duty cycle in the proceeding PWM switching cycle.

DESCRIPTION OF THE VIEWS OF THE DRAWINGS

The following description and drawings set forth certain illustrative implementations of the disclosure in detail, which are indicative of several ways in which the various principles of the disclosure may be carried out. The illustrated examples, however, are not exhaustive of the many possible embodiments of the disclosure. Other objects, advantages and novel features of the disclosure will be set forth in the following detailed description when considered in conjunction with the drawings, in which.

DETAILED DESCRIPTION

Figure 1:
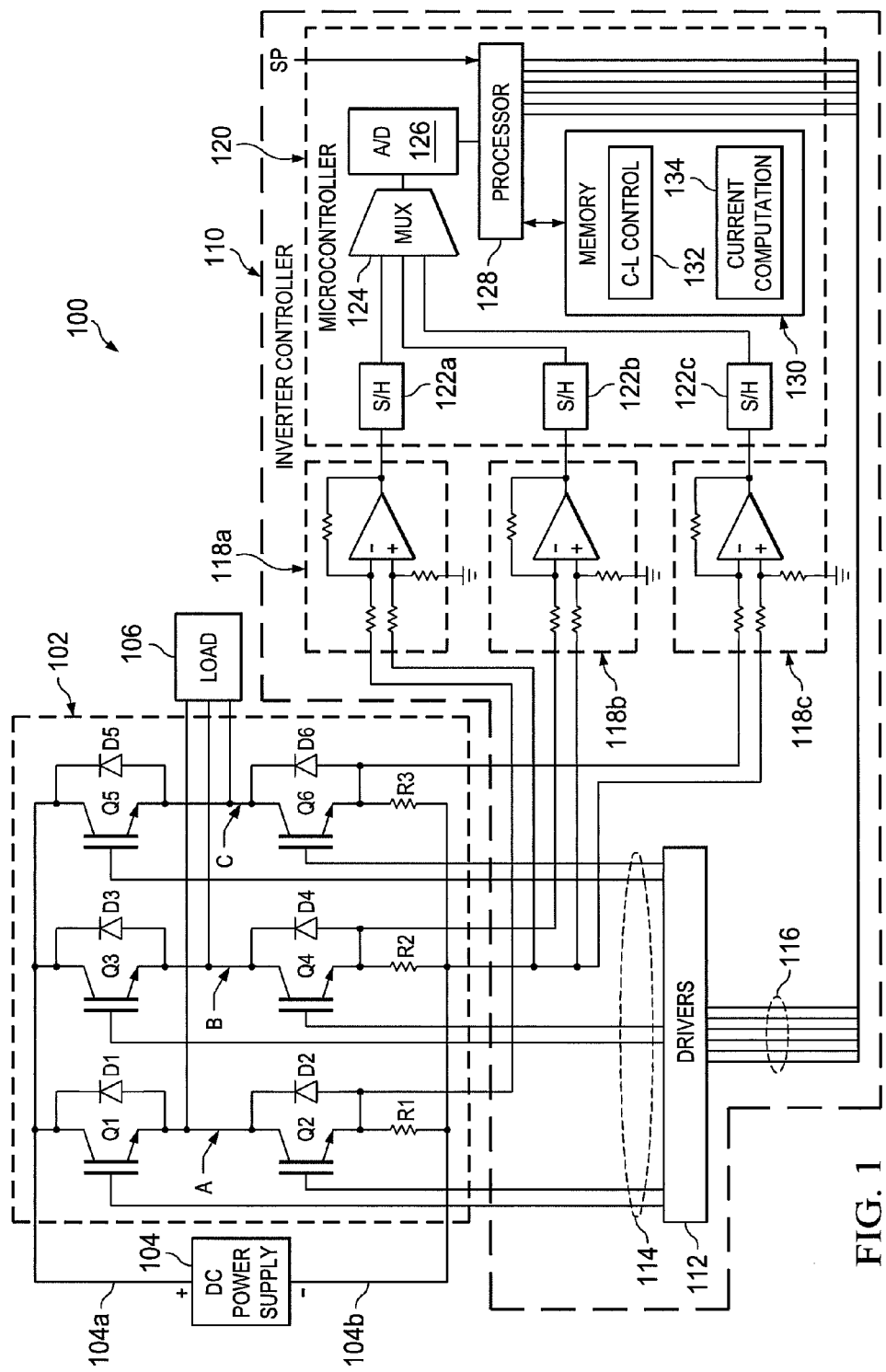
FIG. 1 is a schematic system diagram illustrating a multiphase inverter control apparatus with a closed loop controller and a computation circuit for selectively computing one of the phase current feedback values using low side current shunt voltage values corresponding to the remaining output phases.

FIG. 1 is a schematic system diagram illustrating a multiphase power system 100 with a multiphase inverter control apparatus 110 having a closed loop controller 132 and a computation circuit 134 for selectively computing one phase current feedback value using low side current shunt voltage values corresponding to the remaining output phases. The system 100 includes a multiphase inverter 102, in one example a three-phase system having output phases A, B and C providing output power to a load 106, although other embodiments employ multiphase inverters having more than three output phases. The inverter receives DC input power from a DC power supply 104 providing a DC voltage at positive and negative terminals or nodes 104a and 104b, respectively, and includes IGBT switching devices Q1-Q6 along with corresponding diodes D1-D6. Other forms of switches may be used in various embodiments, including without limitation MOSFETs, etc. The IGBTs Q1, Q3 and Q5 in the embodiment 102 are configured as high side switches coupled (e.g., connected) between the positive DC node 104a and the corresponding output phases A, B and C, respectively, and Q2, Q4 and Q6 are coupled as low side switches between the corresponding output phases A, B and C and the negative DC terminal 104b.

Low side current shunts (e.g., resistors) R1, R2 and R3 are respectively coupled between the corresponding low side switches Q2, Q4 and Q6 and the negative DC terminal 104b for sensing phase currents during the low side on-times during which the corresponding switches Q2, Q4, Q6 are turned on. As seen in FIG. 1, the inverter switches Q1-Q6 are operated according to corresponding driver signals 114 provided by driver circuitry 112. Any suitable driver circuitry 112 can be employed by which suitable signals 114 are provided to the control terminals of the corresponding switches Q1-Q6 in order to selectively turn individual switches on or off according to switching control signals 116 for conversion of DC input power from the supply 104 to provide variable frequency, variable amplitude output voltages and currents to the load 106 via the inverter output phases A, B and C. In certain embodiments, for example, the driver circuitry 112 can include isolation components (e.g., opto couplers, transformers, etc.).

The inverter control apparatus 110 in FIG. 1 includes the driver circuitry 112 as well as sense amplifier circuitry 118 including amplifier circuits 118a, 118b and 118c that sense the low side currents according to voltage signals received from the current shunts R1-R3 associated with phases A, B and C, respectively. The amplifiers 118 provide amplifier output signals representing the low side current switching device currents flowing in the corresponding phases as inputs to a microcontroller 120. In this example, the microcontroller 120 includes sample hold (S/H) circuits 122a, 122b and 122c individually operatively coupled for sampling and holding the amplifier output signal from a corresponding one of the amplifiers 118. The sample hold circuits 122 individually provide an output voltage representing a sample amplifier output signal as an input to a multiplexer (MUX) circuit 124 that multiplexes the amplifier output signals under control of a processor 128 to provide a selected input signal to an A/D converter 126. The A/D converter 126 converts sample voltages to digital values and provides a plurality of current shunt voltage values corresponding to the output phases A, B and C according to the output voltages of the sample hold circuits 122, with the processor 128 operatively coupled with the sample hold circuits 122 and the multiplexer 124 in order to control the sampling times in the multiplexer channel selection during each of a plurality of PWM switching cycles to operate the inverter 102 according to current feedback information.

As further seen in FIG. 1, the microcontroller 120 further includes an electronic memory 130, with the processor 128 operable according to program instructions stored in the memory 130 in order to perform various tasks including implementation of a closed loop controller 132 and a current computation component or circuit 134. Although the illustrated embodiment provides for processor implementation of the controller 132 and the current computation circuit 134, other embodiments are possible in which the controller 132 and/or the current computation circuit 134 can be implemented in separate circuits, which need not be programmable or configurable. In operation, the controller 132 is operable for controlling the electrical output conditions of the inverter 102 through generation of PWM switching control signals 116, which in the illustrated embodiment are provided as Boolean outputs from the processor 128 to the driver circuitry 112. In this configuration, the switching control signals 116 provide selective operation of the high and low side switching devices Q1-Q6 of the inverter 102. Moreover, the controller 132 provides closed-loop regulation, with the PWM switching control signals 116 being generated by the controller 132 at least partially according to phase current feedback values and one or more setpoint signals or values SP.

The controller 132 in certain embodiments also employs further feedback information (e.g., line-line or line-neutral output phase voltage signals or values, not shown) and implements a suitable pulse width modulation technique (e.g., space vector modulation in one non-limiting example) by computing a voltage vector magnitude and angle θ in each of a series of PWM cycles. The controller 132 generates the switching control signals 116 in order to provide output power to the load 106 while regulating one or more inverter output conditions (e.g., multiphase output voltage, output currents, output waveform speed, etc.) according to the setpoint information SP. In certain embodiments, the setpoint SP is a fixed value stored in the electronic memory 130. In other implementations, one or more setpoints SP is/are received from an external system or user interface (not shown) for adjustment by the microcontroller 120 of the output conditions of the inverter 102.

Figure 2:
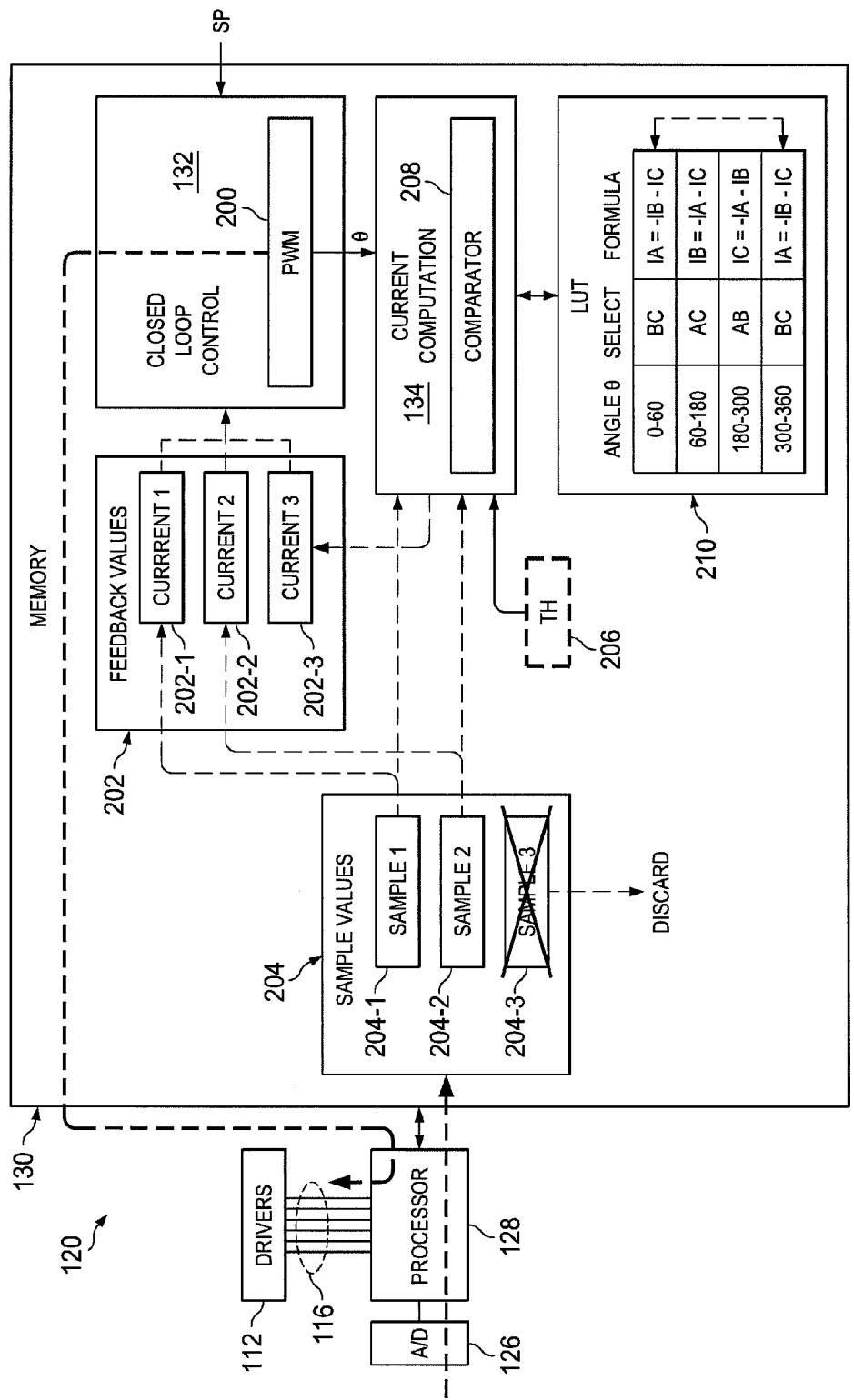
FIG. 2 is a partial schematic diagram illustrating further details of one embodiment of the control apparatus with a computation circuit selecting a given phase and a given formula for feedback value computation according to a computed voltage vector angle.

FIG. 2 is a partial schematic diagram illustrating further details of one embodiment of the control apparatus 110 with a computation circuit 134 operable to select a given phase A, B or C and a given formula from a lookup table 210 for feedback value computation according to a computed voltage vector angle θ computed and provided by the controller 132. In this embodiment, the controller 132 compares one or more current operating conditions of the inverter 102, including feedback values 202 representing the phase output currents from the three inverter output phases A, B and C and/or information derived therefrom, with the setpoint information SP according to one or more control configurations. Based on this comparison, one or more error values are computed to determine control outputs for driving the inverter operation to a desired setpoint condition or conditions. The closed loop controller 132 in certain embodiments computes a command voltage vector including a magnitude (e.g., modulation index) and a corresponding phase angle θ used by a PWM component or circuit 200 in generating the PWM control signals 116. In certain embodiments, a single control loop can be provided, or multiple loop control topologies can be implemented by the controller 132, for example, using proportional-integral (PI), proportional-integral-derivative (PID) control circuits or algorithms implemented via the processor 128 to provide command values representing one or more desired operating conditions of the inverter 102.

The PWM component 200 uses this command information to generate the PWM switching control signals 116 which are provided by the processor 128 to the driver circuitry 112 in order to control the output conditions of the multiphase inverter 102. In addition, the controller 132 provides the voltage vector angle θ to the computation circuit 134. As shown, the PWM component 200 may be implemented by the processor 128 through execution of corresponding instructions stored in the memory 130, using any suitable pulse width modulation algorithms, such as generation of a series of values for each output phase representing triangle carrier waves for modulation according to command values for the individual phases, with selection of high side or low side activation based on whether the command value is above or below the corresponding carrier for a particular phase. Other embodiments are possible in which the PWM component 200 is implemented as a separate circuit, for example, having analog triangle waveform generators for each phase and comparator circuitry comparing a command signal for each phase with the corresponding carrier waveform to selectively activate the high or low side switch for each given phase. Moreover, separate implementations of the PWM component 200 are contemplated in which an analog signal representing the voltage vector angle θ is provided directly to a computation circuit 134 and/or is converted to digital form to provide an angle value θ to the computation circuit 134.

As further seen in FIG. 2, the computation circuit 134 receives the angle θ as a signal or value from the controller 132 in each PWM cycle, and uses this to index a lookup table (LUT) 210 for selection of low side current shunt voltage sample values 204 corresponding to two of the three phases A, B and C received via the A/D converter 126. The current computation circuit 134 identifies a given one of the inverter phases A, B or C in a given PWM switching cycle, and selectively computes a phase current feedback value 202 for that given phase using the low side current shunt voltage sample values 204 corresponding to the remaining phases. For example, if the electrical angle θ of the computed voltage vector is between 0° and 60° or between 300° and 360°, phases B and C are selected and the computation circuit 134 selectively uses the corresponding selected phase samples (e.g., SAMPLE 1, 204-1 and SAMPLE 2, 204-2 in FIG. 2) to selectively compute a phase current feedback value (CURRENT 3, 202-3) for the identified given phase A. In this case, moreover, the given phase A for either of these electrical angle ranges has the smallest or lowest low side duty cycle on-time with respect to the pulse width modulation operation of the inverter 102. In this case, the computation circuit 134 selects the formula IA=−IB−IC from the LUT 210 for computing the feedback value 202-3 (IA) as a function of the selected phase samples 204-1 and 204-2, and the computation circuit 134 discards the sample 204-3.

The computation circuit 134 updates the set of phase current feedback values 202 for use by the controller 132 with the given computed phase current feedback value 202-3, and uses the sample values 204-1 and 204-2 in order to update the feedback values 202-1 and 202-2, respectively. The sample values for the phases having relatively long low side duty cycle on-times are used for the corresponding feedback values 202, whereas the computation circuit 134 discards the sample 204-3 corresponding to the given phase (e.g., phase A in this example) having the shortest low side duty cycle on-time, and instead computes a corresponding feedback value 202-3 using the more reliable sample values 204-1 and 204-2. The selective operation of the computation circuit 134 in this example can mitigate or avoid uncertainty or inaccuracy in closed loop operation in this manner through discarding a potentially unreliable feedback sample and using a computed value 202-3 derived from samples 204-1 and 204-2 corresponding to longer low side duty cycle on-times for which settling time sampling issues are less likely. As shown in the lookup table 210 of FIG. 2, the computation circuit 134 selects phases A and C for electrical angles θ in the range of 60° through 180° and computes the identified given phase B according to a corresponding formula (IB=−IA−IC). In this embodiment, moreover, the computation circuit 134 identifies the given phase C where the angle θ is in the range of 180° through 300°, and computes a corresponding feedback value 202 according to the formula IC=−IA−IB based on the corresponding entry in the lookup table 210. The illustrated embodiment includes formulas derived from Kirchhoff's current law for Y-connected loads 106, but other predefined formulas can be used to accommodate different load conditions by which the phase current feedback value 202 can be computed for the given phase having the lowest low side on-time duty cycle in a given PWM switching cycle.

As further seen in FIG. 2, certain embodiments of the computation circuit 138 employ a predetermined threshold signal or value 206 (TH) and a comparator circuit, component or algorithm 208. In one possible implementation, the threshold 206 is a value stored in the memory 130. In other embodiments, the threshold can be provided to an analog comparator circuit 208 as a predetermined voltage signal from a reference circuit (not shown). The controller 132 in this embodiment provides the low side duty cycle on-time of the given phase (e.g., the smallest computed on-time for the current PWM switching cycle), and the comparator 208 compares this with a threshold 206 to determine whether the low side duty cycle on-time of the given phase is less than the threshold 206. If the low side duty cycle on-time is less than the threshold 206, the computation circuit 134 computes the given phase current feedback value (e.g., 202-3) at least partially according to the low side current shunt voltage values (e.g., 204-1 and 204-2) corresponding to remaining output phases, and updates the feedback values 202 with the computed given phase current feedback value (e.g., 202-3) and with the low side current shunt voltage values corresponding to the other output phases, and discards the sample (e.g., 204-3) corresponding to the given phase for that PWM cycle. If the low side duty cycle on-time of the given phase is instead greater than or equal to the threshold 206, the computation circuit 134 updates the phase current feedback values 202 with low side current shunt voltage values 204-1, 204-2, 204-3 corresponding to all output inverter phases.

Figure 3:
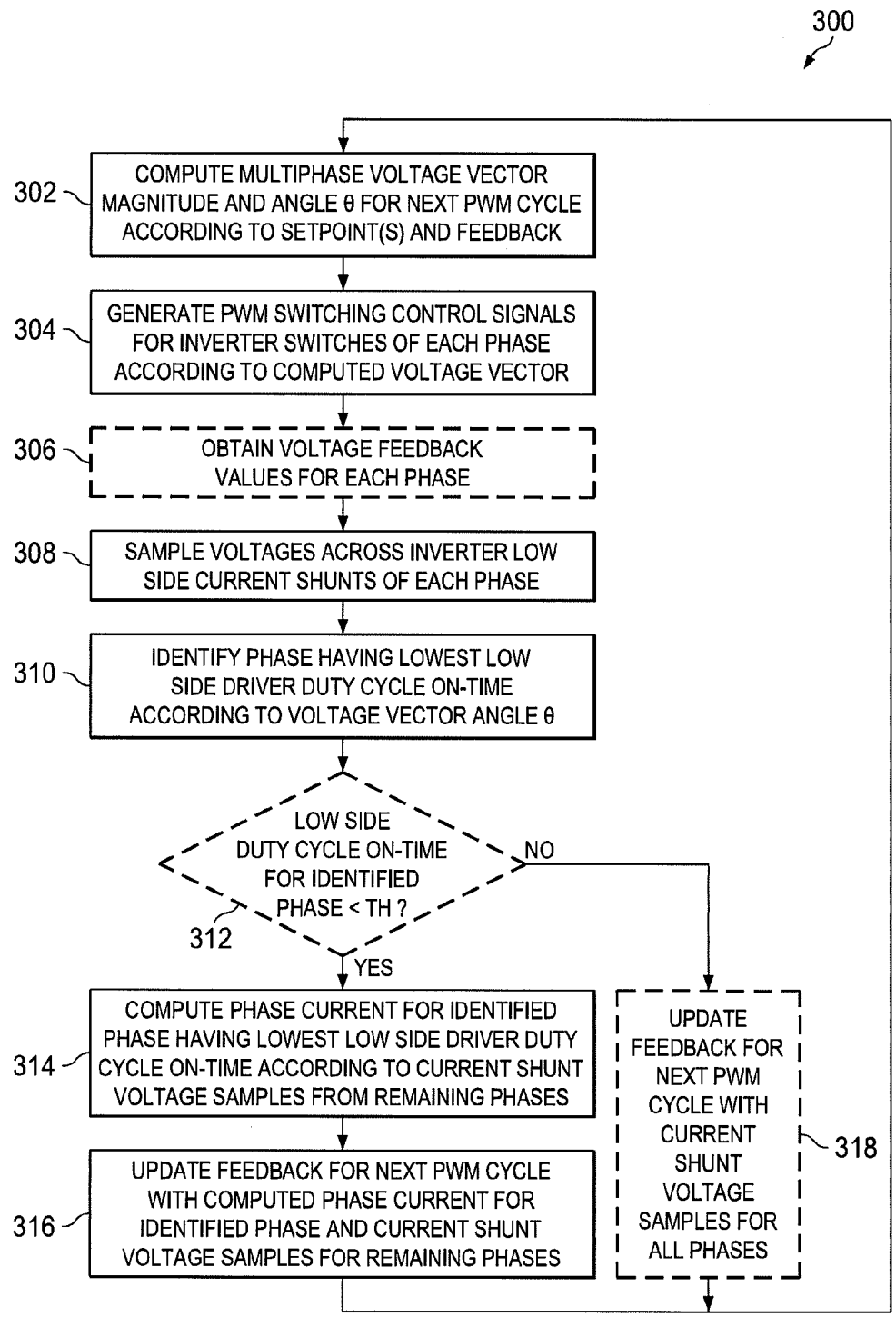
FIG. 3 is a flow diagram illustrating a process for controlling a multiphase inverter.

FIG. 3 provides a flow diagram illustrating a process 300 for controlling a multiphase inverter. In certain embodiments, the controller 132 and the computation circuit 134 are implemented in a processor 128 by corresponding program instructions stored in the memory 130 to implement the process 300 of FIG. 3. In other embodiments, the process 300 is implemented in any suitable analog and/or digital circuitry, programmable or otherwise, for example in the inverter control apparatus 110 shown in FIG. 1 above or other suitable circui Although the method 300 and other methods are illustrated and described in the form of a series of acts or events, it will be appreciated that the various methods of the disclosure are not limited by the illustrated ordering of such acts or events except as specifically set forth herein. In this regard, except as specifically provided hereinafter, some acts or events may occur in different order and/or concurrently with other acts or events apart from those illustrated and described herein, and not all illustrated steps may be required to implement a process or method in accordance with the present disclosure. The illustrated methods may be implemented in hardware as illustrated and described above, and/or using processor-executed software, processor-executed firmware, FPGAs, logic circuitry, etc. or combinations thereof, in order to provide the inverter control functionality described herein, although the present disclosure is not limited to the specifically illustrated or described applications and systems.

FIG. 3 illustrates an example PWM switching cycle including computing a multiphase voltage vector including magnitude and an angle θ at 302 for the next PWM cycle according to one or more setpoints and feedback information (e.g., SP in FIGS. 1 and 2 and feedback values 202 in FIG. 2 above). The illustrated process 300 further includes generating PWM switching control signals at 304 (e.g., signals 116) to selectively operate the inverter switches (e.g., Q1-Q6) of each phase according to the computed voltage vector, and certain embodiments may optionally include obtaining voltage feedback values for each phase at 306, although not required for all embodiments of the process 300. At 308, the process further includes sampling voltages across the inverter low side current shunts of each phase (e.g., sampling the voltages across the resistors R1-R3 using the amplifiers 118, sample hold circuits 122, multiplexer 124 and A/D converter 126 in FIG. 1 above). At 310 in FIG. 3, a given inverter phase is identified (e.g., by the control apparatus 110) having the lowest low side driver duty cycle on-time, for example, according to the voltage vector angle θ computed at 302.

In certain embodiments, a determination is made at 312 (e.g., by the current computation circuit 134) as to whether the duty cycle on-time for the identified given phase is less than a threshold TH (e.g., threshold 206 in FIG. 2), and if not (NO at 312), the process 300 proceeds to 318 with the current computation circuit 134 selectively updating feedback for the next PWM cycle with the current shunt voltage samples for all phases, and the process 300 proceeds back to 302 as described above for the next PWM cycle using these feedback values (e.g., feedback values 202 updated with all the sample values 204 in FIG. 2).

Otherwise (YES at 312), the phase current for the identified given phase having the lowest low side duty cycle on-time is computed according to the shunt voltage sample values from the remaining phases at 314. The feedback value (e.g., 202-3 in the example above) for that given phase is updated at 316 with the computed phase current, and the remaining feedback values (e.g., 202-1 and 202-2) are updated with the current shunt voltage samples (e.g., 204-1 and 204-2, respectively) for control processing in the next PWM switching cycle beginning again at 302 as described above. In certain embodiments, the illustrated optional processing at 312 and 318 is omitted, and the phase current feedback value for the given phase having the lowest low side duty cycle on-time is computed in each PWM cycle at 314 and is used in the feedback value updating at 316.

Figure 4:
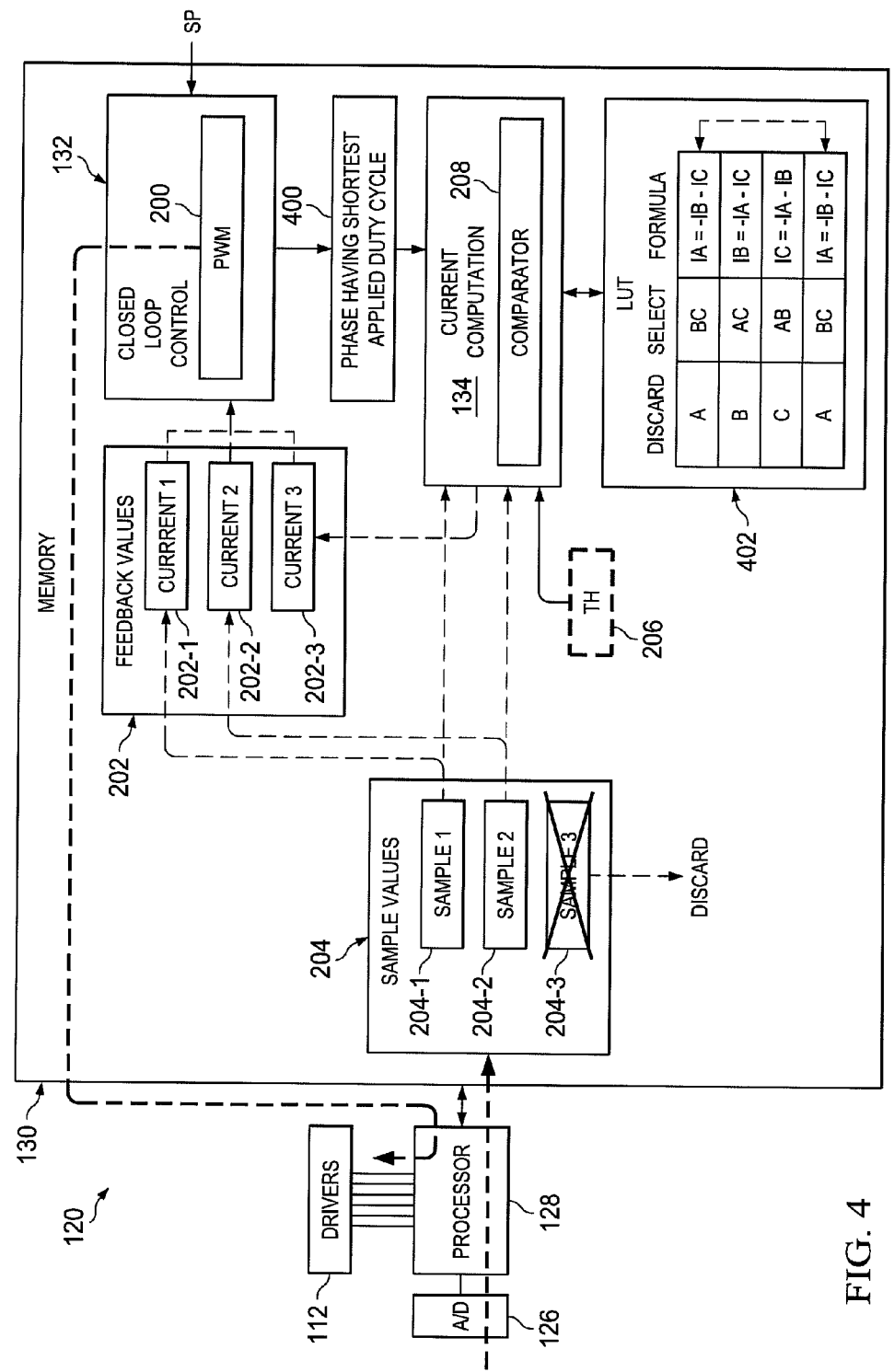
FIG. 4 is a partial schematic diagram showing a second control apparatus embodiment with a computation circuit selecting a given phase and formula for feedback value computation according to an indication of the phase having the smallest duty cycle in a proceeding PWM switching cycle.

FIG. 4 illustrates a second inverter control apparatus embodiment 110 with a computation circuit 134 identifying or selecting the given phase and formula for feedback value computation according to an indication 400 from the controller 132 indicating the phase having the smallest duty cycle on-time applied in a proceeding PWM switching cycle. In this embodiment, no computed voltage vector phase angle θ is required for the selective current computation processing. In addition, the embodiment of FIG. 4 includes a lookup table 402 employed by the current computation circuit 134 to determine which phase sample value 204 is to be discarded according to the indication 400 from the controller 132. In this case, the computation circuit 134 selects the indicated remaining phases according to the indicated given phase, and uses the remaining phase sample values 204 to compute a feedback value 202 for use in association with the given phase.

Figure 5:
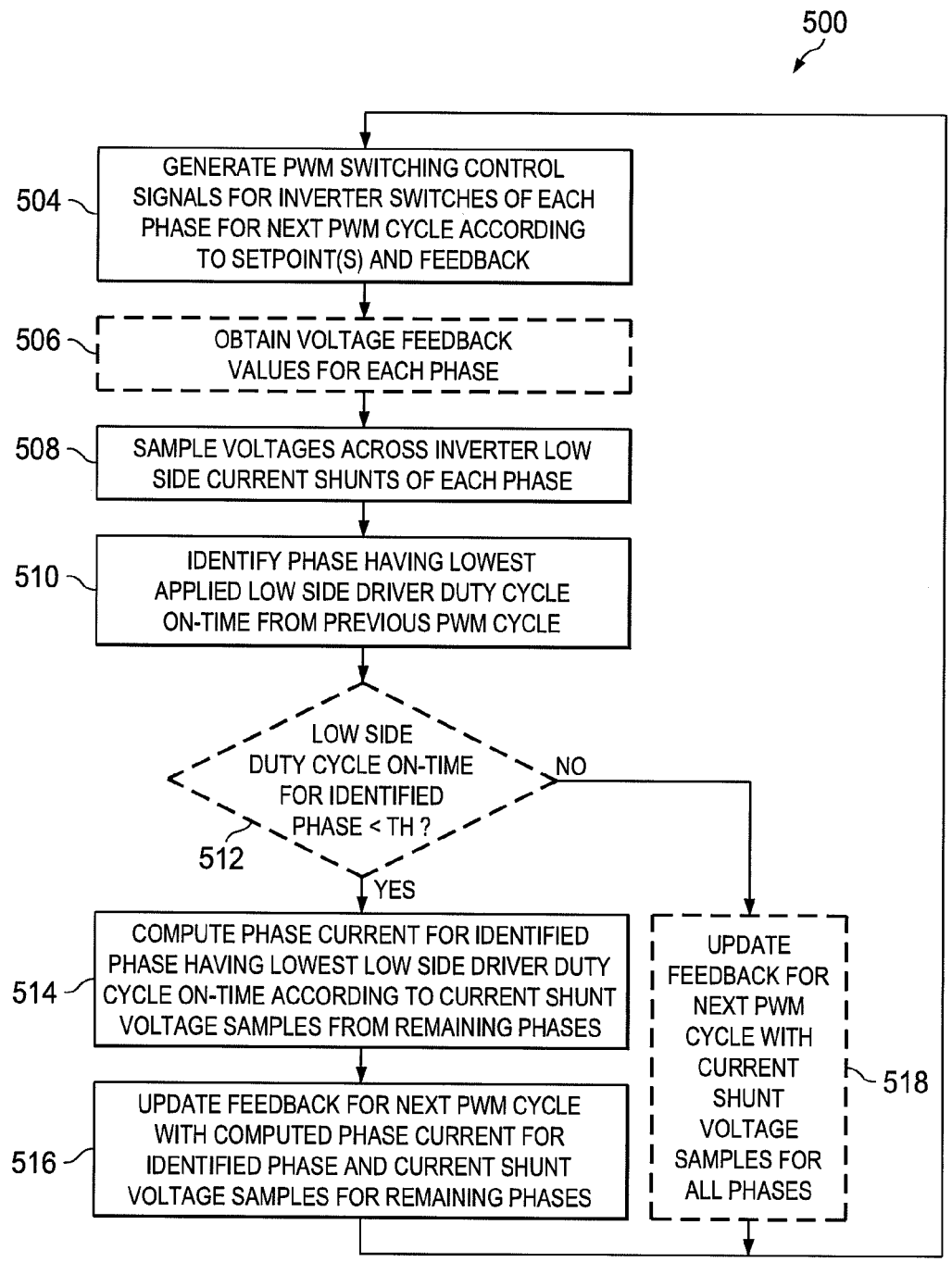
FIG. 5 is a flow diagram illustrating another process embodiment for controlling a multiphase inverter.

FIG. 5 is a flow diagram illustrating another process or method embodiment 500 for controlling a multiphase inverter. The process 500 in certain embodiments is implemented via the controller 132 and computation circuit 134 in the embodiment of FIG. 4, although the process 500 is not limited to implementation in the illustrated control apparatus or systems. A new PWM switching control cycle begins at 504 in FIG. 5, where PWM switching control signals are generated for the switches of each inverter phase according to one or more setpoints and feedback information, and voltage feedback may optionally be obtained at 506 for each phase. At 508, voltages across the low side current shunts are sampled, and a given phase is identified at 510 having the lowest applied low side duty cycle on-time from the previous PWM cycle. For example, the controller 132 in certain embodiments compares the three low side on-times from the previous cycle, and provides an indication (e.g., 400 in FIG. 4) of the given phase corresponding to the lowest low side on-time to the current computation circuit 134. As with the above process 300 of FIG. 3, threshold comparison processing is performed at 512 and 518 in FIG. 5 to determine at 512 whether the low side duty cycle on-time for the given identified phase is less than a threshold, and if not (NO at 512), to omit the phase current computation processing and instead update the feedback values 202 for the next cycle at 518 with the voltage samples 204. If this optional processing is not employed in a given embodiment, or if the determination at 512 indicates that the low side duty cycle on-time for the given phase is below the threshold (YES at 512), the phase current feedback value 202 for the given phase is computed at 514 according to the current shunt voltage samples 204 from the remaining phases, and the feedback values 202 are updated at 516 with the computed phase current for the given phase and with the current shunt voltage samples 204 for the remaining phases, and the processing of the next cycle begins again at 504.

Figure 6:
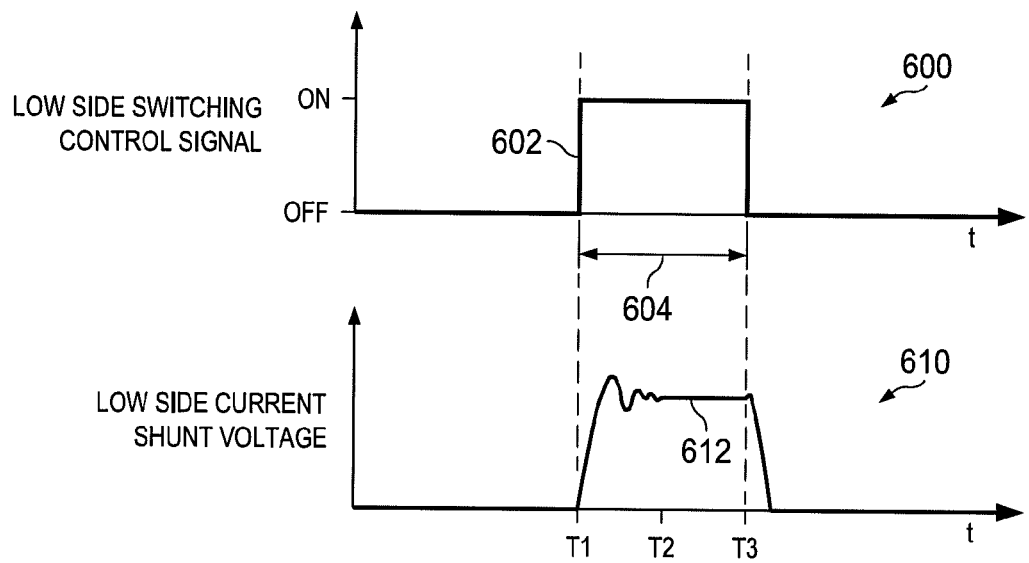
FIG. 6 is a graph illustrating low side PWM switching control signals and corresponding low side current shunt voltage signals for a first low side on-time duty cycle.

FIG. 6 provides a graph 600 illustrating an example low side PWM switching control waveform 602 and a graph 610 showing a corresponding low side current shunt voltage signal 612 for a first low side on-time duty cycle 604 beginning at time T1 and ending at time T3. As seen in FIG. 6, a certain non-zero settling time (T2−T1) is required before sampling in order to ensure that the sample signal (e.g., from the sample hold circuit 122 in FIG. 1 above) has sufficiently settled within a least significant bit of the A/D converter 126 to ensure accurate sampling of the actual current flowing through the low side switch, and thereby ensure that the closed loop control implemented by the controller 132 is stable and accurate. In this case, preferred sampling does not begin until time T2 in order to allow the amplifier output signal to adequately stabilize, and the sampling is preferably completed by time T3 to avoid sampling during the ramp down of the signal waveform 612 after the low side switch is turned off.

Figure 7:
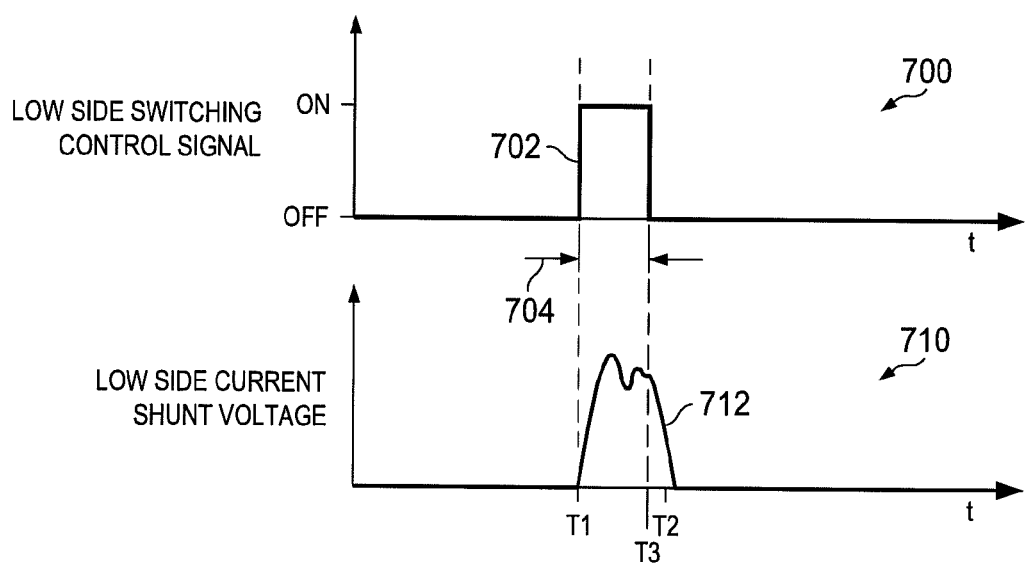
FIG. 7 is a graph illustrating low side PWM switching control signals and corresponding low side current shunt voltage signals for a shorter second low side on-time duty cycle.

FIG. 7 provides graphs 700 and 710 showing the case of a shorter second low side on-time duty cycle 704 beginning at T1 and ending at T3 for a low side switching control signal waveform 702 in graph 700, and the corresponding low side current shunt voltage 712 in graph 710. As seen in FIG. 7, the shortened low side duty cycle on-time 704 in FIG. 7 does not allow proper or adequate time for sampling the low side current shunt voltage. The situation can result from a number of causes, such as increases in the PWM switching frequency of the multiphase inverter 102, and/or high operating inverter output speeds leading to significant EMF and the resultant closed loop control calling for significantly decreased low side on-times, or combinations of multiple causes. As previously noted, however, the concepts of the present disclosure implemented in the above-described apparatus can advantageously mitigate the adverse effects of this situation by selectively discarding any sample obtained from the current shunt voltage waveform 702, and instead computing the corresponding phase current value using the samples from the other phases which have adequately long low side duty cycle on-times for a given PWM switching cycle, without requiring modification or costly improvement to the amplifier circuitry 118 and without other added cost or complexity to the control apparatus 110.

Figure 8:
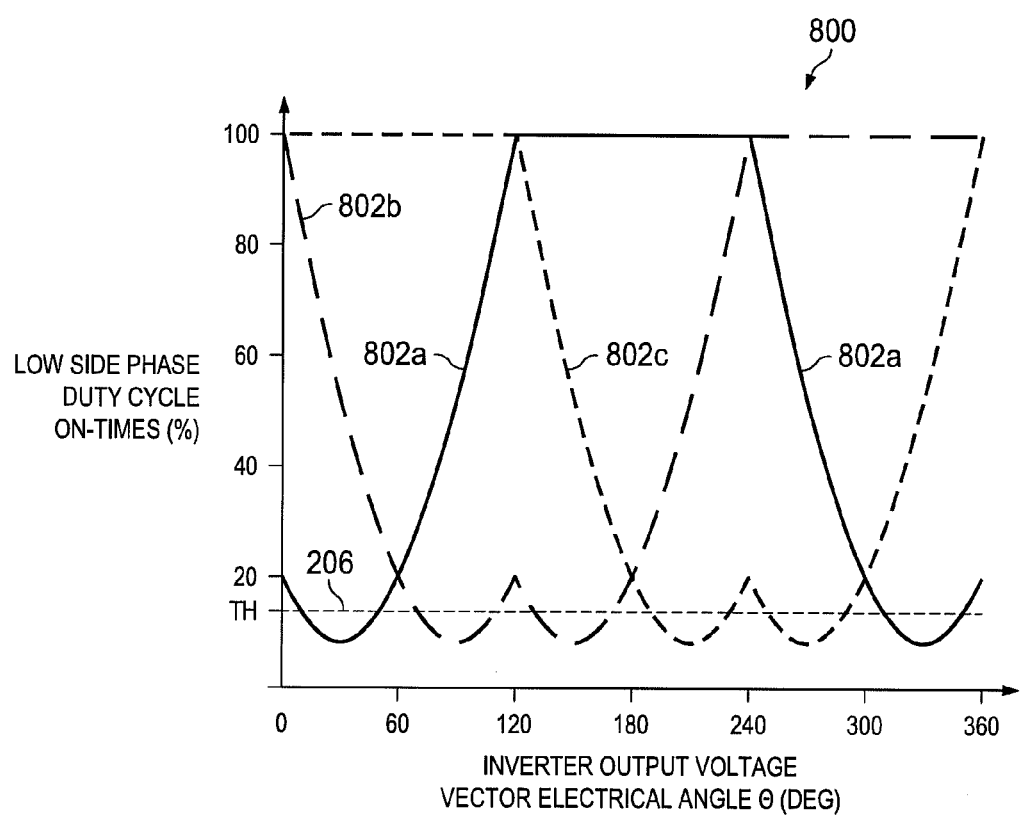
FIG. 8 is a graph illustrating low side phase duty cycle on-times as a function of inverter output voltage vector electrical angle.

FIG. 8 provides a graph 800 illustrating low side phase duty cycle percentage on-times 802a, 802b and 802c respectively corresponding to phases A, B and C of the above described multiphase inverter 102 above as a function of inverter output voltage vector electrical angle θ. As seen in the graph 800, the corresponding low side duty cycle on-times can vary through a range from 0% to 100% as a function of the electrical angle θ, with different phases having the shortest or smallest low side duty cycle on-time for different angular ranges. Moreover, higher EMF, particularly at high inverter output frequencies, and lower DC bus voltages tend to lower the minimum on-time durations for the low side switches. As also seen in the example lookup table 210 of FIG. 2 above, moreover, the duty cycle 802a of phase A is lower than the other two duty cycles in the phase angle ranges of 0°-60° and 300°-360°. For the electrical angle θ in the range of 60° through 120°, the low side on-time 802b corresponding to phase B is the lowest, and that of phase C is lowest in the range of 180°-300°. FIG. 8 further illustrates an example threshold 206 which is employed by the computation circuit 134 in certain embodiments to selectively compute a phase angle feedback value 202 for a given phase having the lowest low side duty cycle on-time when the corresponding on-time 802 for that phase is below the threshold 206, and otherwise all the sample values 204 are used as the feedback 202, thereby reducing computation overhead until actually needed. This feature of certain embodiments may advantageously facilitate selective adjustment for a particular operating PWM switching frequency and for a particular set of amplifier circuitry 118 and sample hold circuitry 122 for a given application.

The above examples are merely illustrative of several possible embodiments of various aspects of the present disclosure, wherein equivalent alterations and/or modifications will occur to others skilled in the art upon reading and understanding this specification and the annexed drawings. In addition, although a particular feature of the disclosure may have been disclosed with respect to only one of multiple implementations, such feature may be combined with one or more other features of other embodiments as may be desired and advantageous for any given or particular application. Also, to the extent that the terms "including", "includes", "having", "has", "with", or variants thereof are used in the detailed description and/or in the claims, such terms are intended to be inclusive in a manner similar to the term "comprising".

What is claimed is:

1. A control apparatus for controlling a multiphase inverter, comprising:
a controller for controlling an electrical output condition of the multiphase inverter, the controller operable to generate pulse width modulation switching control signals to selectively operate a plurality of high and low side switching devices of the multiphase inverter at least partially according to a plurality of phase current feedback values individually corresponding to one of a plurality of output phases of the multiphase inverter;
a computation circuit for selectively computing one of the phase current feedback values, the computation circuit operable to identify a given phase of the multiphase inverter having a lowest low side duty cycle on-time in a given pulse width modulation switching cycle, selectively compute a given phase current feedback value corresponding to the given phase at least partially according to low side current shunt voltage values corresponding to remaining output phases of the multiphase inverter, and selectively update the plurality of phase current feedback values with the given phase current feedback value and the low side current shunt voltage values corresponding to the remaining output phases.

2. The control apparatus of claim 1, wherein the controller is operable to compute a voltage vector angle, and to generate the pulse width modulation switching control signals at least partially according to the voltage vector angle and the plurality of phase current feedback values, and wherein the computation circuit is operable to identify the given phase according to the voltage vector angle.

3. The control apparatus of claim 2, wherein the computation circuit is operable to:
determine whether the low side duty cycle on-time of the given phase is less than a predetermined duty cycle threshold in the given pulse width modulation switching cycle;

compute the given phase current feedback value at least partially according to the low side current shunt voltage values corresponding to remaining output phases of the multiphase inverter, and selectively update the plurality of phase current feedback values with the given phase current feedback value and the low side current shunt voltage values corresponding to the remaining output phases if the low side duty cycle on-time of the given phase is less than the predetermined duty cycle threshold in the given pulse width modulation switching cycle; and update the plurality of phase current feedback values with low side current shunt voltage values corresponding to all output phases of the multiphase inverter if the low side duty cycle on-time of the given phase is greater than or equal to the predetermined duty cycle threshold in the given pulse width modulation switching cycle.

4. The control apparatus of claim 3, wherein the computation circuit is operable to select a given one of a plurality of predetermined formulas according to the voltage vector angle, and to compute the given phase current feedback value according to the low side current shunt voltage values corresponding to the remaining output phases using the given formula if the low side duty cycle on-time of the given phase is less than the predetermined duty cycle threshold in the given pulse width modulation switching cycle.

5. The control apparatus of claim 2, wherein the computation circuit is operable to select a given one of a plurality of predetermined formulas according to the voltage vector angle, and to compute the given phase current feedback value according to the low side current shunt voltage values corresponding to the remaining output phases using the given formula.

6. The control apparatus of claim 1, wherein the computation circuit is operable to identify the given phase according to an indication from the controller regarding a phase having a shortest applied duty cycle in the preceding pulse width modulation switching cycle.

7. The control apparatus of claim 6, wherein the computation circuit is operable to:
determine whether the low side duty cycle on-time of the given phase is less than a predetermined duty cycle threshold in the given pulse width modulation switching cycle;

compute the given phase current feedback value at least partially according to the low side current shunt voltage values corresponding to remaining output phases of the multiphase inverter, and selectively update the plurality of phase current feedback values with the given phase current feedback value and the low side current shunt voltage values corresponding to the remaining output phases if the low side duty cycle on-time of the given phase is less than the predetermined duty cycle threshold in the given pulse width modulation switching cycle; and update the plurality of phase current feedback values with low side current shunt voltage values corresponding to all output phases of the multiphase inverter if the low side duty cycle on-time of the given phase is greater than or equal to the predetermined duty cycle threshold in the given pulse width modulation switching cycle.

8. The control apparatus of claim 7, wherein the computation circuit is operable to select a given one of a plurality of predetermined formulas according to the indication from the controller, and to compute the given phase current feedback value according to the low side current shunt voltage values corresponding to the remaining output phases using the given formula if the low side duty cycle on-time of the given phase is less than the predetermined duty cycle threshold in the given pulse width modulation switching cycle.

9. The control apparatus of claim 6, wherein the computation circuit is operable to select a given one of a plurality of predetermined formulas according to the indication from the controller, and to compute the given phase current feedback value according to the low side current shunt voltage values corresponding to the remaining output phases using the given formula.

10. The control apparatus of claim 1, comprising:
an electronic memory; and
at least one processor operatively coupled with the electronic memory and operable according to instructions stored in the electronic memory to implement the controller and the computation circuit.

11. A system for controlling a multiphase inverter, comprising:
a driver circuit operatively coupled to provide a plurality of drivers signals to control terminals of a plurality of high and low side switching devices of the multiphase inverter;
a plurality of amplifiers for sensing a plurality of low side currents individually corresponding a corresponding output phase of the multiphase inverter, the amplifiers individually coupled with a low side current shunt connected to conduct low side switching device current flowing in a corresponding one of the low side switching devices associated with the corresponding output phase and providing an amplifier output signal representing the low side current switching device current flowing in the corresponding output phase;
a plurality of sample hold circuits individually operatively coupled with a corresponding one of the amplifiers for sampling and holding the corresponding amplifier output signal, the individual sample hold circuits providing an output voltage representing a sampled amplifier output signal from the corresponding amplifier;
at least one analog to digital converter for converting sampled voltages to digital values, the at least one analog to digital converter operable to provide a plurality of current shunt voltage values corresponding to the plurality of output phases according to the output voltages of the plurality of sample hold circuits; and
at least one processor operatively coupled with the at least one analog to digital converter and operable according to instructions stored in an electronic memory to:
generate pulse width modulation switching control signals to selectively operate the switching devices of the multiphase inverter at least partially according to a plurality of phase current feedback values individually corresponding to one of the plurality of output phases,
identify a given phase of the multiphase inverter having a lowest low side duty cycle on-time in a given pulse width modulation switching cycle,
selectively compute a given phase current feedback value corresponding to the given phase at least partially according to the low side current shunt voltage values corresponding to remaining output phases of the multiphase inverter, and
selectively update the plurality of phase current feedback values with the given phase current feedback value and the low side current shunt voltage values corresponding to the remaining output phases.

12. The system of claim 11, wherein the at least one processor is operable to:

compute a voltage vector angle;
generate the pulse width modulation switching control signals at least partially according to the voltage vector angle and the plurality of phase current feedback values; and
identify the given phase according to the voltage vector angle.

13. The system of claim 12, wherein the at least one processor is operable to:
determine whether the low side duty cycle on-time of the given phase is less than a predetermined duty cycle threshold in the given pulse width modulation switching cycle;
if the low side duty cycle on-time of the given phase is less than the predetermined duty cycle threshold in the given pulse width modulation switching cycle, compute the given phase current feedback value at least partially according to the low side current shunt voltage values corresponding to remaining output phases of the multiphase inverter, and selectively update the plurality of phase current feedback values with the given phase current feedback value and the low side current shunt voltage values corresponding to the remaining output phases; and
if the low side duty cycle on-time of the given phase is greater than or equal to the predetermined duty cycle threshold in the given pulse width modulation switching cycle, update the plurality of phase current feedback values with low side current shunt voltage values corresponding to all output phases of the multiphase inverter.

14. The system of claim 12, wherein the at least one processor is operable to:
select a given one of a plurality of predetermined formulas according to the voltage vector angle; and
compute the given phase current feedback value according to the low side current shunt voltage values corresponding to the remaining output phases using the given formula.

15. The system apparatus of claim 11, wherein the at least one processor is operable to identify the given phase according to an indication from the controller indicating a phase having a shortest applied duty cycle in the preceding pulse width modulation switching cycle.

16. The system of claim 15, wherein the at least one processor is operable to:
determine whether the low side duty cycle on-time of the given phase is less than a predetermined duty cycle threshold in the given pulse width modulation switching cycle;
if the low side duty cycle on-time of the given phase is less than the predetermined duty cycle threshold in the given pulse width modulation switching cycle, compute the given phase current feedback value at least partially according to the low side current shunt voltage values corresponding to remaining output phases of the multiphase inverter, and selectively update the plurality of phase current feedback values with the given phase current feedback value and the low side current shunt voltage values corresponding to the remaining output phases; and
if the low side duty cycle on-time of the given phase is greater than or equal to the predetermined duty cycle threshold in the given pulse width modulation switching cycle, update the plurality of phase current feedback values with low side current shunt voltage values corresponding to all output phases of the multiphase inverter.

17. The system of claim 15, wherein the at least one processor is operable to select a given one of a plurality of predetermined formulas according to the indication from the controller, and to compute the given phase current feedback value according to the low side current shunt voltage values corresponding to the remaining output phases using the given formula.

18. A method for controlling a multiphase inverter, the method comprising:
generating pulse width modulation switching control signals to selectively operate switching devices of the multiphase inverter at least partially according to a plurality of phase current feedback values individually corresponding to one of a plurality of output phases of the multiphase inverter;
identifying a given phase of the multiphase inverter having a lowest low side duty cycle on-time in a given pulse width modulation switching cycle;
selectively computing a given phase current feedback value corresponding to the given phase at least partially according to the low side current shunt voltage values corresponding to remaining output phases of the multiphase inverter; and
selectively updating the plurality of phase current feedback values with the given phase current feedback value and the low side current shunt voltage values corresponding to the remaining output phases.

19. The method of claim 18, comprising:
computing a voltage vector angle;
generating the pulse width modulation switching control signals at least partially according to the voltage vector angle and the plurality of phase current feedback values; and
identifying the given phase according to the voltage vector angle.

20. The method of claim 18, comprising identifying the given phase according to an indication indicating a phase having a shortest applied duty cycle in the preceding pulse width modulation switching cycle.

* * * * *